US011408622B2

(12) United States Patent
Borders et al.

(10) Patent No.: US 11,408,622 B2
(45) Date of Patent: Aug. 9, 2022

(54) CONTROL WITH ENHANCED SENSING CAPABILITIES (71) Applicant: DELTA T, LLC, Lexington, KY (US)

(72) Inventors: Marcus Landon Borders, Lexington, KY (US); Richard Alan Oleson, Lexington, KY (US)

(73) Assignee: DELTA T, LLC, Lexington, KY (US)

( * ) Notice: Subject to any disclaimer, the term of this patent is extended or adjusted under 35 U.S.C. 154(b) by 841 days.

(21) Appl. No.: 15/755,652

(22) PCT Filed: Aug. 25, 2016

(86) PCT No.: PCT/US2016/048569
§ 371 (c)(1),
(2) Date: Feb. 27, 2018

(87) PCT Pub. No.: WO2017/035312
PCT Pub. Date: Mar. 2, 2017

(65) Prior Publication Data
US 2019/0346162 A1   Nov. 14, 2019

Related U.S. Application Data (60) Provisional application No. 62/210,703, filed on Aug. 27, 2015.

(51) Int. Cl.
G01K 1/20      (2006.01)
G01K 1/16      (2006.01)
(Continued)

(52) U.S. Cl.
CPC ............ F24F 7/007 (2013.01); F04D 27/004 (2013.01); G01K 1/16 (2013.01); G01K 1/20 (2013.01);
(Continued)

(58) Field of Classification Search
CPC ...... G05D 23/00; G05D 23/015; G05D 23/20; G01K 1/20; G01K 1/16
(Continued)

(56) References Cited

U.S. PATENT DOCUMENTS 2,273,375  A  *  2/1942  Ray .......................... G01K 5/00
                                                          337/79
3,940,665  A  *  2/1976  Seki ................... H05K 7/20509
                                                          361/692
(Continued)

FOREIGN PATENT DOCUMENTS

DE    102017218221 A1  *  4/2019  ............... G01K 1/20
JP         57199925 A  *  2/1981  ............... G01K 1/16
(Continued)

Primary Examiner — Edelmira Bosques
Assistant Examiner — Frances F. Hamilton
(74) Attorney, Agent, or Firm — Dickinson Wright PLLC; Andrew D. Dorisio (57) ABSTRACT An apparatus for controlling a device in connection with a sensed temperature in a space includes an actuator for regulating the operation of the device, a temperature sensor for providing the sensed temperature, and a thermal antenna connected to the temperature sensor. The thermal antenna may form part of the exposed face of the apparatus. A housing may include partitions, such as a plurality of circuit boards, for communicating with the actuator to provide control for the device. The partitions or circuit boards are spaced apart to form ventilation channels for ventilating heat from the housing, including byway of an encouraging convective flow.

14 Claims, 7 Drawing Sheets (51) Int. Cl.
  *F24F 110/20* (2018.01)
  *F24F 7/007* (2006.01)
  *F04D 27/00* (2006.01)
  *F24F 11/77* (2018.01)
  *F24F 110/12* (2018.01)
  *F04D 25/08* (2006.01)
  *F24F 110/10* (2018.01)

(52) U.S. Cl.
  CPC ............ *F04D 25/088* (2013.01); *F24F 11/77* (2018.01); *F24F 2110/10* (2018.01); *F24F 2110/12* (2018.01); *F24F 2110/20* (2018.01)

(58) Field of Classification Search
  USPC ............. 454/338; 236/DIG. 19, 1 C; 257/70, 257/E23.08, E23.086; 374/135, E1.011
  See application file for complete search history.

(56) References Cited

U.S. PATENT DOCUMENTS

| | | | | |
|---|---|---|---|---|
| 4,139,151 | A * | 2/1979 | Thornburgh | G05D 23/10 123/568.26 |
| 4,318,073 | A * | 3/1982 | Rossler, Jr. | H01C 7/04 338/30 |
| 4,347,443 | A * | 8/1982 | Whitney | G05D 23/20 361/692 |
| 4,423,407 | A * | 12/1983 | Zuckerman | G01N 27/12 338/34 |
| 4,659,236 | A * | 4/1987 | Hobbs | G01K 1/14 374/173 |
| 4,789,850 | A * | 12/1988 | Sepso | G01K 7/22 29/612 |
| 4,803,380 | A * | 2/1989 | Jacoby, Jr. | H01H 9/02 338/159 |
| 5,008,775 | A * | 4/1991 | Schindler | G05D 23/24 374/185 |
| 5,022,766 | A * | 6/1991 | Phipps | G01K 1/14 374/163 |
| 5,208,516 | A * | 5/1993 | Saidian | H05B 39/085 315/362 |
| 5,558,436 | A * | 9/1996 | Richards | G01K 1/14 374/208 |
| 5,695,285 | A * | 12/1997 | Kuberka | G01K 1/16 136/230 |
| 5,731,953 | A * | 3/1998 | Sakurai | B60H 1/00271 361/695 |
| 6,082,894 | A * | 7/2000 | Batko | G01K 1/16 236/51 |
| 6,213,404 | B1 * | 4/2001 | Dushane | F24D 19/10 165/205 |
| 6,293,697 | B1 * | 9/2001 | Gul | H01H 37/04 174/547 |
| 6,329,655 | B1 * | 12/2001 | Jack | G01J 5/02 250/338.1 |
| 6,415,984 | B1 | 7/2002 | Parker et al. | |
| 6,619,556 | B1 * | 9/2003 | Snider | B60H 1/00792 236/DIG. 19 |
| 6,709,155 | B2 * | 3/2004 | Knittel | B60H 1/00792 236/DIG. 12 |
| 7,197,927 | B2 * | 4/2007 | Stauss | F24F 11/30 374/142 |
| 7,465,088 | B2 * | 12/2008 | Garcia | G01K 1/14 320/150 |
| 7,900,849 | B2 * | 3/2011 | Barton | F24F 11/30 236/51 |
| 7,938,336 | B2 * | 5/2011 | Rhodes | G05D 23/1902 236/1 C |
| 8,197,130 | B2 * | 6/2012 | Wille | G01K 1/20 374/138 |
| 8,382,368 | B2 * | 2/2013 | Huynh | G01K 1/14 374/141 |
| 8,567,687 | B2 * | 10/2013 | Schneider | B60H 1/00985 236/1 C |
| 8,651,735 | B2 * | 2/2014 | Regensburger | G01K 1/20 374/141 |
| 8,887,671 | B2 * | 11/2014 | Patterson | F24H 9/2014 122/4 A |
| 9,173,332 | B2 * | 10/2015 | Gupta | H05K 7/20418 |
| 9,241,559 | B2 * | 1/2016 | Davis | G01D 11/30 |
| 9,766,606 | B2 * | 9/2017 | Fadell | G06F 3/0362 |
| 9,810,590 | B2 * | 11/2017 | Huppi | G01K 1/08 |
| 9,863,656 | B2 * | 1/2018 | Amerson | F24F 11/50 |
| 9,967,761 | B2 * | 5/2018 | Mehrgardt | H04B 1/3877 |
| 10,041,818 | B2 * | 8/2018 | Graff | G01K 1/14 |
| 10,209,688 | B2 * | 2/2019 | Stefanski | G05D 23/193 |
| 10,332,697 | B2 * | 6/2019 | Stammer | F25B 31/00 |
| 2002/0048308 | A1 * | 4/2002 | Knittel | G01K 13/00 374/185 |
| 2002/0090908 | A1 * | 7/2002 | Estepp | F24F 11/745 454/236 |
| 2003/0185278 | A1 * | 10/2003 | Roepke | H01M 10/486 374/152 |
| 2003/0223474 | A1 * | 12/2003 | Roepke | G01K 1/16 374/152 |
| 2005/0058179 | A1 * | 3/2005 | Phipps | G01K 1/08 374/208 |
| 2006/0113398 | A1 * | 6/2006 | Ashworth | F24F 11/30 236/1 C |
| 2007/0195102 | A1 * | 8/2007 | Peters | H01H 9/52 345/553 |
| 2007/0248142 | A1 * | 10/2007 | Rountree | G01K 1/16 374/141 |
| 2008/0317093 | A1 * | 12/2008 | Mau | G01J 5/04 374/E13.003 |
| 2010/0302065 | A1 * | 12/2010 | Tanielian | G01W 1/02 340/901 |
| 2011/0280279 | A1 * | 11/2011 | Gregory | G01K 7/343 374/152 |
| 2012/0128025 | A1 * | 5/2012 | Huppi | G01J 5/02 374/121 |
| 2013/0142215 | A1 * | 6/2013 | Nemirovsky | H01Q 21/061 374/121 |
| 2014/0190494 | A1 | 7/2014 | Ely | |
| 2015/0005953 | A1 * | 1/2015 | Fadell | F24F 11/63 700/276 |
| 2015/0124853 | A1 * | 5/2015 | Huppi | G01K 13/00 374/142 |
| 2015/0228419 | A1 * | 8/2015 | Fadell | H04L 12/282 307/112 |
| 2015/0241281 | A1 * | 8/2015 | Corcos | G01J 5/10 250/349 |
| 2016/0378322 | A1 * | 12/2016 | Klicpera | G06F 3/0362 715/773 |
| 2020/0101646 | A1 * | 4/2020 | Yamazaki | B29C 45/14467 |

FOREIGN PATENT DOCUMENTS

| | | | | |
|---|---|---|---|---|
| JP | | 57199925 A | * 12/1982 | ............... G01K 1/16 |
| WO | WO2014071046 | | 5/2014 | |

* cited by examiner

CONTROL WITH ENHANCED SENSING CAPABILITIES

This application claims the benefit of U.S. Provisional Patent Application Ser. No. 62/210,703, the disclosure of which is incorporated by reference. The disclosure of International Patent Application No. PCT/US15/27998 is incorporated herein by reference.

FIELD OF THE INVENTION

This disclosure relates generally to the control arts and, in particular, to a control with enhanced sensing capabilities and an improved snap fit engagement.

BACKGROUND OF THE INVENTION

A device for controlling environmental conditions, such as a light or ceiling fan, may incorporate a sensor to provide a measure of an ambient condition in order to regulate the operation of the device. In some instances, including the sensor on the device itself leads to skewing of the ambient conditions being sensed, such as due to heat resulting from the consumption of power, or the mounting location of the device (such as along a ceiling, in the case of a ceiling fan). Others have proposed remote controls, such as for example wall mounted switches, to alleviate this concern. However, these switches are typically associated with a power converter (such as for stepping down the power from AC mains), which can also lead to skewing of the readings produced by onboard sensors.

Moreover, a known challenge in the design of snap fit engagements is the limited elastic deformation of the thermoplastic materials commonly used. Specifically, it can be difficult, within a compact space such as a junction box, to provide sufficient depth of engagement to form a strong connection without exceeding the elastic limit of the flexing component of the snap fit engagement.

Accordingly, a need is identified for one or more solutions to address (independently or collectively) any or all of the foregoing limitations, along with others that have yet to be discovered.

SUMMARY

According to one aspect of the disclosure, an apparatus for controlling a device in connection with a sensed temperature in a space. The apparatus comprises an actuator for regulating the operation of the device. A temperature sensor is provided for sensing sensed temperature. A thermal antenna is connected to the temperature sensor.

In one embodiment, the device is a light or a fan, and the actuator comprises a button (mechanical or icon) for regulating an intensity of the light or a speed of the fan. The thermal antenna may be at least partially exposed to the space. In one example, the thermal antenna comprises a conductive material and a non-conductive material, with the conductive material being exposed to the space. The non-conductive material and the conductive material may form a pocket for receiving the temperature sensor.

The apparatus may also include a humidity sensor, as well as a power converter. An insulator (thermal) may be provided for insulating the thermal antenna and the temperature sensor from the power converter. A first vent and a second vent promote a flow of air within the apparatus (such as a housing thereof), and a sensor (e.g., temperature or humidity) is positioned in the path of the air flow. Specifically, a passageway may be provided for promoting a convective flow of air, which in turn promotes the intake of air into the first vent.

The apparatus may include a housing with a plurality of partitions, such as circuit boards for communicating with the actuator to provide control for the device. The circuit boards may be spaced apart and form one or more ventilation channels for ventilating heat from the housing. At least three circuit boards may create two ventilation channels between each adjacent pair of circuit boards, at least one of which provides convective flow for promoting the flow of air into an inlet. The partitions or boards may be in sealed engagement along the sides of the housing but open at the top and bottom to promote controlled airflow through the channel.

According to a further aspect of the disclosure, an apparatus for controlling a device in connection with a sensed environmental condition in a space is provided. The apparatus includes an actuator for regulating the operation of the device, a sensor for sensing the environmental condition, and first and second vents for providing a flow of air within the apparatus. The environmental condition sensor is positioned in the path of the flow of air.

In one embodiment, the environmental condition sensor comprises a humidity sensor, a temperature sensor, or a combination of the two. A channel may be provided for promoting a convective flow of air, which in turn promotes the intake of air into the first vent. Each vent may be provided between the actuator and a housing including a power converter, and the channel for promoting the flow of convective air may adjacent to the power converter (or a like heat source). Any of the foregoing apparatus may further include a light level sensor, an occupancy sensor, or both.

According to a further aspect of the disclosure, a wall control includes a convective flow path in a first part for inducing air flow within a second part of the wall control. A sensor may be positioned in the second part in the path of the induced airflow.

Yet a further aspect of the disclosure pertains to a wall control including a temperature antenna forming a part of a face of the control. The control may further include at least one button for regulating the operation of a device controlled by the wall control. The button may form part of a face of the control.

Still a further aspect of the disclosure pertains to an apparatus for controlling a device in connection with a sensed temperature in a space. The apparatus comprises an actuator for regulating the operation of the device, and a housing with at least two circuit boards for communicating with the actuator to provide control for the device. The at least two circuit boards being spaced apart and forming a ventilation channel for ventilating heat from the housing.

In one embodiment, a temperature sensor provides the sensed temperature, and a thermal antenna is connected to the temperature sensor. The housing may be adapted for fitting at least partially within a junction box. The housing may also include a first vent and a second vent for providing a flow of air within the apparatus, with the environmental condition sensor positioned in the path of the air flow.

Yet another aspect of the disclosure pertains to an apparatus for forming a connection between first and second components. The apparatus comprises a first cantilevered spring on the first component, a second cantilevered spring on the second component. The first and second cantilevered springs interact to form a snap fit engagement. In one example, the first component comprises a first part of an enclosure for a wall control and the second component comprises a second part of the enclosure.

In one embodiment, the first component includes a first barb adapted for engaging a second barb of the second component. The second barb may be formed on the second cantilevered spring. Movement of the first cantilevered spring may induce movement of the first barb, and a ramp may be provided for contacting the first cantilevered spring for urging the first barb to the engaged condition. An opening may also be provided for contacting the second barb to release the engagement with the first barb. In one example, the first part comprises a button and the second part comprises a housing.

According to still another aspect of the disclosure, an apparatus for connecting first and second components is provided. The apparatus comprises a first cantilevered spring on the first component, a second cantilevered spring on the second component, and a ramp for urging the first cantilevered spring into a releasable engagement with the second cantilevered spring when the first and second components are positioned for assembly.

A further aspect of the disclosure pertains to methods. For instance, a method of sensing comprises sensing a temperature of a space including a wall using a part of a face of a wall control connected to the wall. A method of manufacturing a wall controller, comprises positioning first and second circuit boards in the wall controller so as to form a flow path for ventilating air from the wall controller, as well as the step of positioning a sensor in the flow path. A method of ventilating a wall controller for controlling an appliance comprises providing a first flow path for allowing air to flow through the wall controller and providing a second flow path for allowing air to flow through the wall controller, the second flow path being closer to a heat source in the wall controller than the first flow path. The method may further include the step of providing a common inlet for the first and second flow paths and a common outlet for the first and second flow paths.

The disclosure may also relate to a method of forming a releasable engagement between first and second components. The method comprises providing a first cantilevered spring on the first component, providing a second cantilevered spring on the second component, and providing a ramp for urging the first cantilevered spring into a releasable engagement with the second cantilevered spring when the first and second components are positioned for being assembled together.

In the following description, several embodiments of the control with enhanced sensing capabilities and an improved snap fit engagement are shown and described. As it should be realized, the arrangement is capable of other, different embodiments and its several details are capable of modification in various, obvious aspects all without departing from the control with enhanced sensing capabilities and an improved snap fit engagement as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the disclosed control with enhanced sensing capabilities and an improved snap fit engagement, serve to explain certain principles thereof. In the drawing figures.

Reference will now be made in detail to the present preferred embodiments of the control with enhanced sensing capabilities and an improved snap fit engagement, examples of which are illustrated in the accompanying drawing figures.

DETAILED DESCRIPTION

Figure 1:
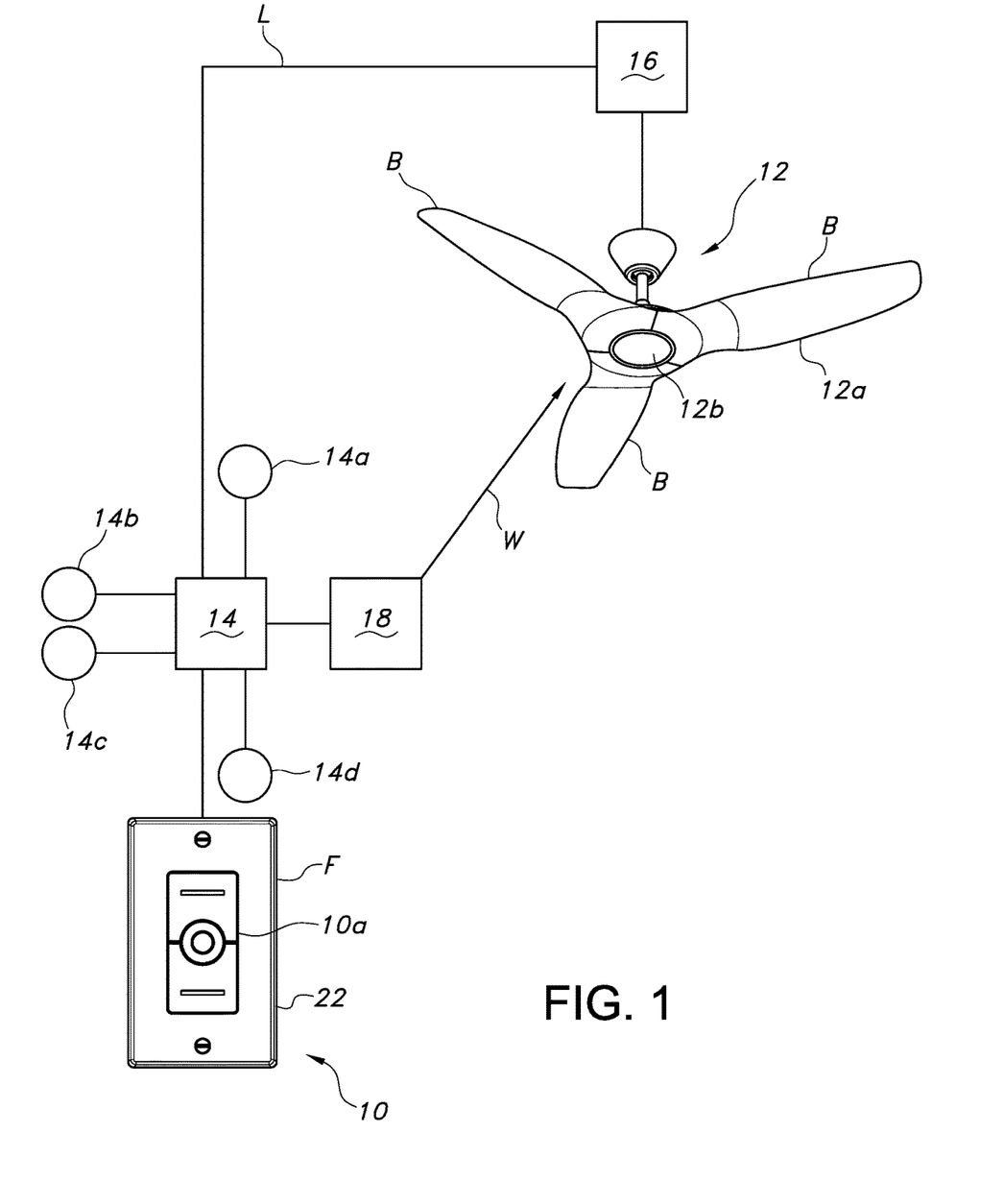
FIG. 1 is a diagrammatic view of one possible environment of use for the control according to various aspects of this disclosure.

Reference is now made to FIG. 1, which schematically illustrates one possible embodiment of a control 10 for regulating the operation of one or more devices or appliances and, in particular, environmental control device(s) 12, such as for example, a fan 12a. For purposes of illustration, the fan 12a is shown as an overhead or ceiling fan. However, the fan 12a could be any type of fan, such as, for example, a pedestal fan, a wall-mounted fan, a window-mounted fan, an exhaust fan, or other type of fan for circulating air in a space.

The device 12 may alternatively or additionally comprise a light 12b, such as a light bulb, light fixture, or light kit for another device. As in the illustrated embodiment, the light 12b may be physically connected to the fan 12a, but could be a separate structure (e.g., a mounted light fixture (recessed or otherwise) including a light, or perhaps even a stand-alone light fixture, such as a floor or table lamp). Also, while only one device 12 is shown, it should be appreciated that the control 10 may be used to control multiple devices, regardless of the particular form, as outlined further in the following description.

In one form, the control 10 may serve as a switch for controlling or activating one or more of the devices 12 (such as by regulating the power supplied thereto), but other forms are possible as described herein. As one example, the control 10 may comprise a wall-mountable unit, with an actuator in the form of a user-input (e.g., button(s) 10a or other mechanical actuator(s), but electronic touch controls or screens are also possible) and an associated support 10b. The actuator, such as button(s) 10a, may have at least one condition or position corresponding to an "off" condition of the device or appliance, and at least one condition or position corresponding to an "on" condition of the device or appliance. The control 10 may also have more than one "on" condition or position, such as, for example, multiple positions or conditions for regulating the device 12, which may be done using the button 10a. The control 10 may include multiple actuators/buttons 10a (FIG. 2), each for independently regulating a different device (such as a fan and a light). The more than one "on" position may also include a continuous increase in fan speed or light intensity as provided by a dimmer switch, for example. The control may also include a display or indicator 10c for providing information to the user, such as the status of one or more devices 12 (e.g., the speed of a fan 12a or the intensity of a light 12b) or an indication of ambient conditions.

Figure 2:
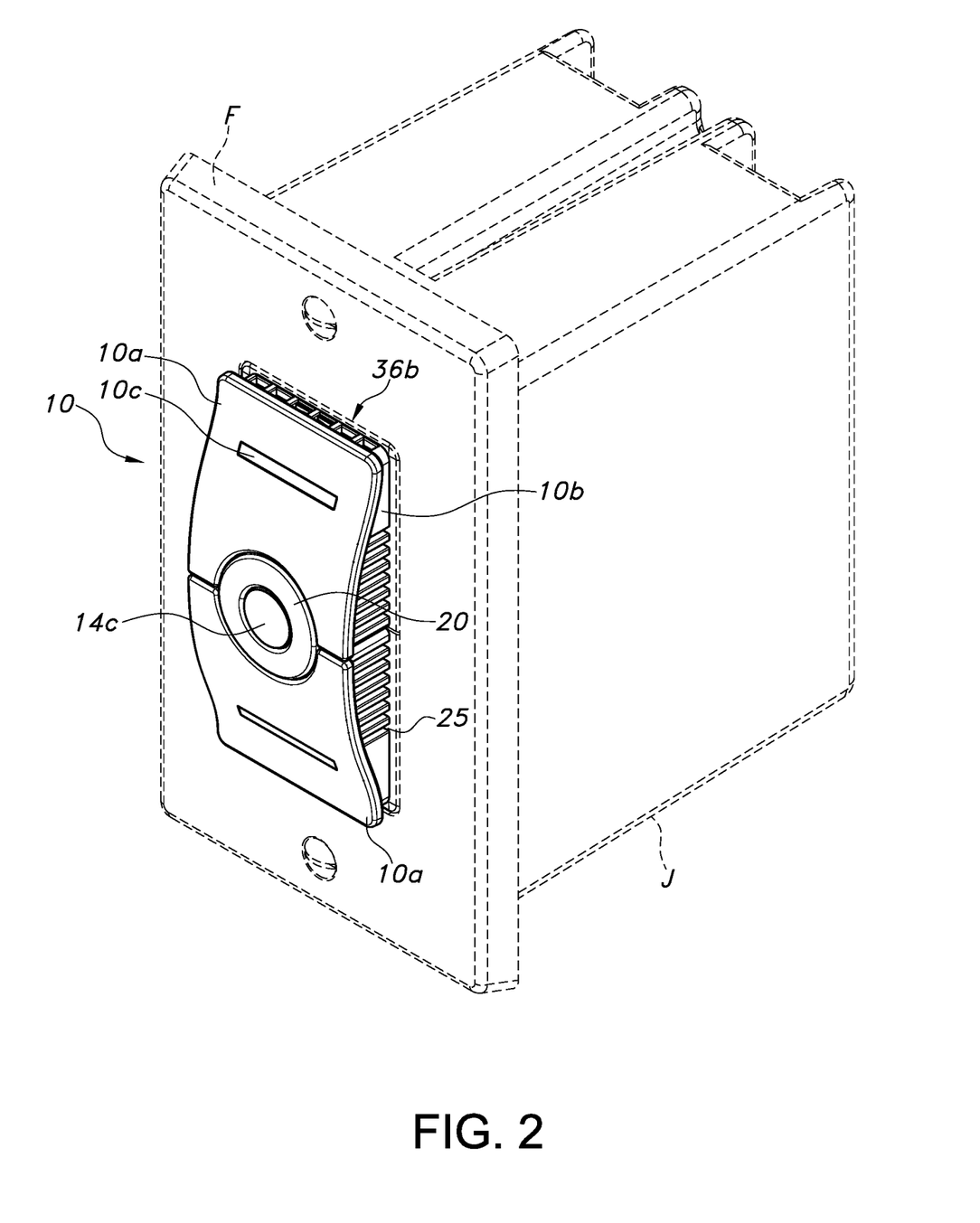
FIG. 2 is a perspective view of the control according to one possible embodiment.

The control 10 may be adapted for mounting in a conventional recessed junction box J (shown in broken lines in FIG. 2). The junction box J may be associated with a partition, such as a wall, ceiling, floor, or like structure bounding a space with which the control or one or more of the appliances or devices 12 is associated. Power for the control 10 may be provided by the conventional AC wiring in a house or building, and/or it may be powered by alternate source(s), such as a battery. A conventional face plate F may also be provided for surrounding the control 10 and concealing any mounting structures used to secure the control within the junction box J. Suitable fasteners may be used to secure the control 10 and/or face plate F.

The control 10 may be associated with a controller 14 for coordinating the control of any connected device(s) 12. The controller 14 in turn may be associated with one or more sensors for sensing conditions at or adjacent the location of the control 10, which sensor(s) thus do not form part of the device 12 (but the control may also receive information from sensor(s) associated with the devices, such as, for example, feedback regarding the operational state or local conditions). This location of the control 10 may be in the same room or space as the device(s) 12, but is considered to be remote therefrom in the sense that it is not physically attached thereto (despite being in communication via wired or wireless connection(s), as discussed below). Alternatively or additionally, the sensed condition may be used by a separate controller 16 (which may be a motor controller, for example) associated with the device 12 to control its operation, such as by activating it, deactivating it, or otherwise regulating its operation. The communication may be by way of wired L or wireless W connection (such as through a wireless radio 18 associated with the control 10).

The control function may thus be coordinated based on a sensed condition provided by associated sensor(s). The sensor or sensors may be selected from the group comprising a temperature sensor 14a, a humidity sensor 14b, an occupancy, presence, or motion sensor 14c, a light sensor 14d (e.g., a photocell), any other sensor for sensing a condition relating to environmental control or conditions (e.g., a gas, chemical, or particulate sensors), or any combination of such sensors. For example, if the presence of a person in the space is detected by the control 10, multiple devices 12 may be regulated on (such as, for example, the light 12b and fan 12a). Similarly, if it is determined to be at or above a particular ambient temperature in a space associated with the control 10, such as based on a temperature sensor, the control may regulate a light 12b to lower or turn off (if on), and may turn on a fan 12a, in an effort to condition the space and make it more comfortable. The speed of the fan 12a and the level of light 12b may also be regulated differently depending on whether the space is determined to be occupied or not (e.g., a higher fan speed may be dictated during periods of non-occupancy, as may be a lower light level; whereas, a lower fan speed may be dictated during a period of occupancy, along with a higher light level, unless a light sensor detects a sufficient amount of ambient light).

Figure 3:
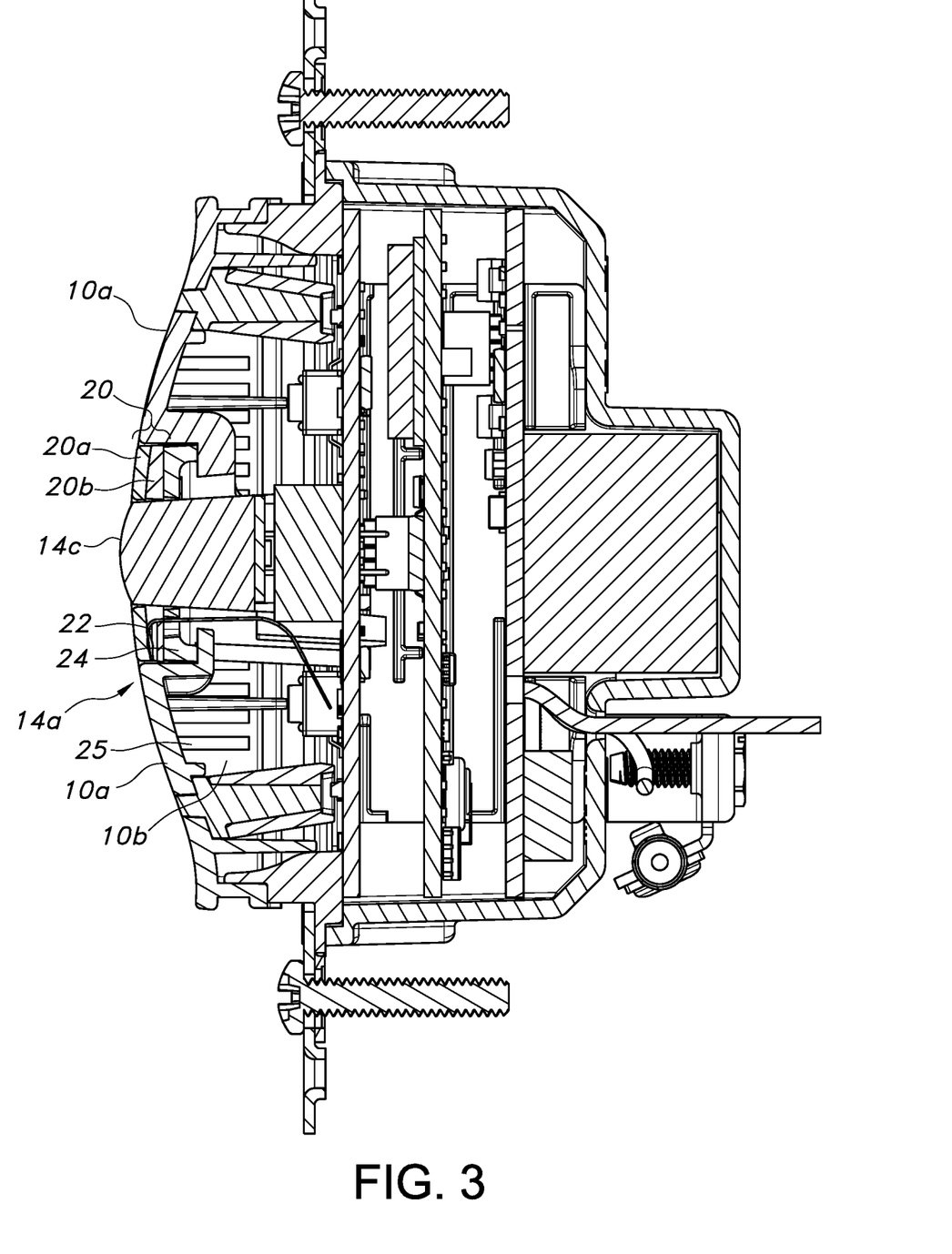
FIG. 3 is a cross-sectional view from the side, illustrating the construction of the control according to one embodiment.

With reference now to FIG. 3, one aspect of the disclosure relates to a particular ambient temperature sensor 14a for use in connection with a control 10. The sensor 14a may comprise several components, including a thermally conductive thermal antenna 20. The antenna 20 responds to the temperature of its surroundings and provides a thermal mass to stabilize temperature readings. In the present embodiment, the thermal antenna 20 comprises a two-part assembly, with a highly conductive (e.g., metal) temperature sensitive component 20a and a plastic insulator/attachment component 20b. The temperature sensitive component 20a may be forward of the insulator/attachment component 20b relative to an associated mounting structure, such as a wall.

The antenna 20 is arranged such that the temperature sensitive component 20a forms part of a face of the control 10, and is thus exposed directly to the ambient environment (that is, the component 20a is exposed to a room or other space for which the environmental conditions are controlled by the control). In the illustrated embodiment, the antenna 20 is positioned between the buttons 10a. The antenna 20 may be annular as shown, but other forms may be used. A further element, such as an occupancy sensor 14c, may be provided in the space formed by the annular antenna 20, which may be used to provide on-off capability for the control 10. In such case, the antenna 20 is surrounded by three distinct structures which regulate the operation of the controlled device 12.

The sensor 14a further includes a temperature sensitive device 22 (such as a thermistor) which monitors the temperature of the thermal antenna 20 and reports to controller 14 (or 16) accordingly to provide a measure of control for the device(s) 12 being regulated. The temperature sensitive device 22 may be positioned in a recess or pocket between components 20a, 20b. The arrangement is such that the sensitive region of the device 22 is maintained in contact with the temperature sensitive component 20a of the thermal antenna 20. In order to help provide for accurate temperature readings, an insulator 24 is also provided to isolate the thermal antenna 20 from heat generated within the control 10 itself. Side openings 25 are also provided for providing a measure of passive crossflow ventilation, which openings may be formed in the support 10b.

As noted above and in FIG. 1, the control 10 may also include a humidity sensor 14b (which itself may incorporate a temperature sensor). The humidity sensor 14b may comprise a humidity sensitive device 26 (such as a semiconductor-based device), as well as a means of inducing a draft of ambient air across the humidity sensing device 26 by a combination of thermal convection and induced air flow. In the illustrated embodiment, this is achieved by an arrangement of partitions (e.g., three), which may comprise circuit boards 30a, 30b, 30c, in an upstanding stack (when the control 10 is oriented as shown), thereby creating two vertical air channels between these boards, along with top and bottom vents 36a, 36b for allowing air to pass at least through the space including the sensor 14b. The assembly is enclosed in a housing 32 such that small air gaps are provided at the upper and lower ends of the boards, with the sides completely enclosed. Together, the buttons 10a, support 10b, and housing 32 may form an enclosure for various internal components of the control 10, such as the circuit boards 30a-30c and a heat-generating power converter 34 for connecting to the AC mains.

Figure 4:
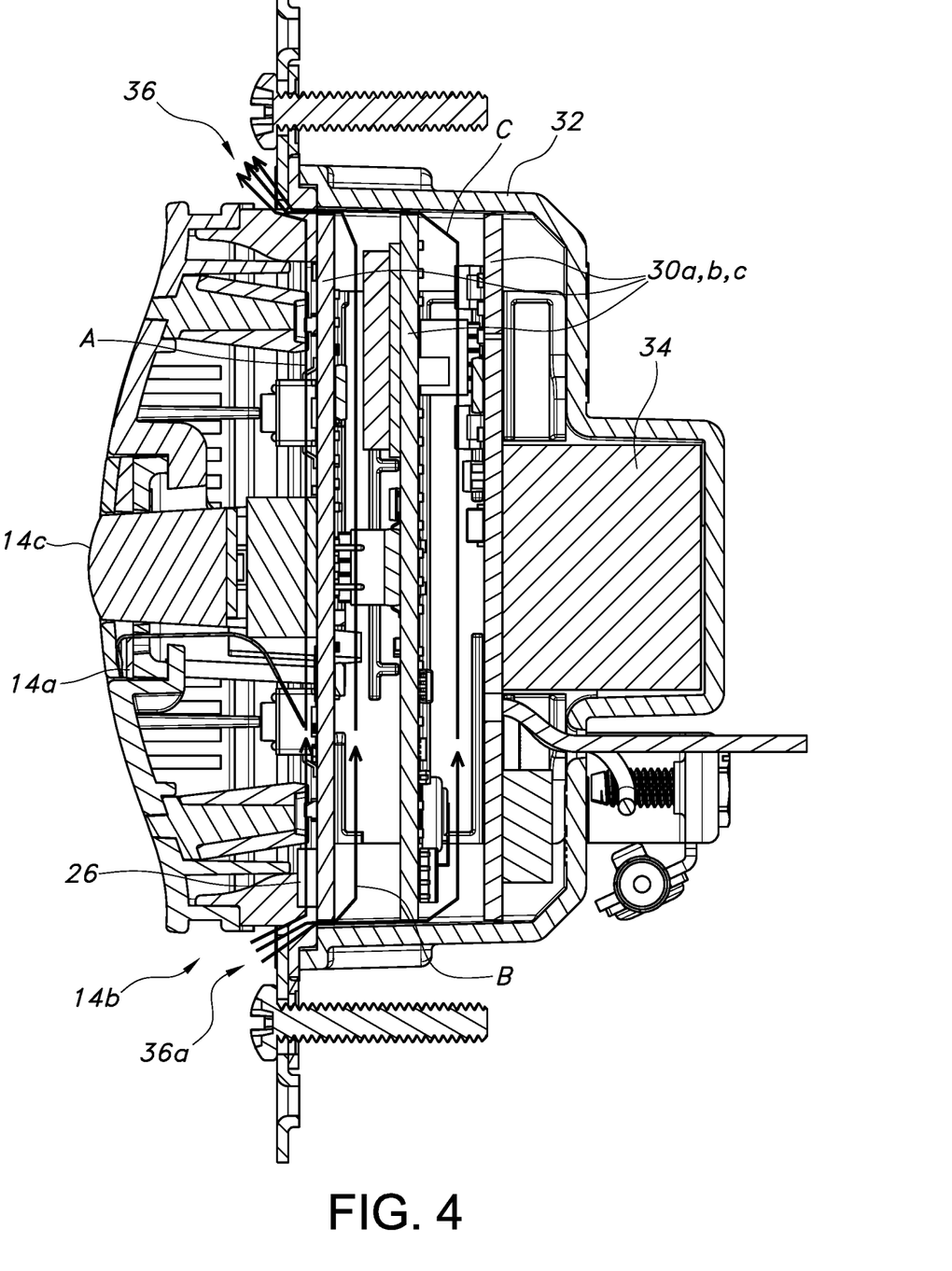
FIG. 4 is a similar cross-sectional view, illustrating the manner of providing for preferential airflow through the control as the result of strategic positioning of the components in an associated housing.

As can be appreciated, the humidity sensor 14b may be located near the bottom, on the front surface of the first board 30a, and the heat-generating power converter 34 is located on the back surface of the third board 30c. Heat generated by the power converter 34 creates a convective flow of air from the bottom to the top, through the channel between the second and third board 30b, 30c. Air drawn in through the bottom vent 36 in response to this convective flow passes the humidity sensor 14b as a result of the guidance provided before reaching the channel between the second and third boards 30b, 30c. A small induced air flow is created by this air movement, causing a vertical flow of air through the channel between the first and second boards 30a, 30b, and also across the front surface of the first board 30a. The preferential flows of air thus ensure that the control 10 achieves a better degree of sensing accuracy, especially when a heat source (e.g., converter 34) is within or adjacent to the relatively small space provided in a typical junction box J.

Figure 5:
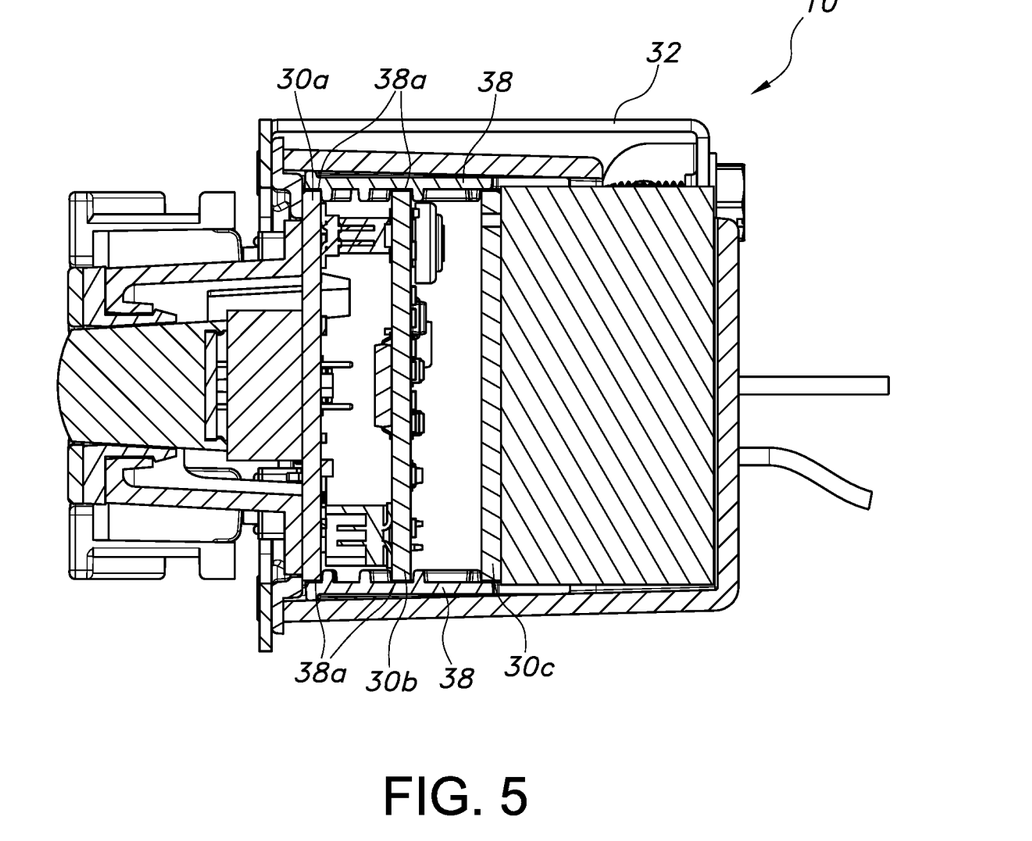
FIG. 5 is a top view illustrating the positioning of the components providing for the preferential airflow.

As can be appreciated, the space between the boards 30a-30c in the stack is kept free of obstruction to air flow by the absence of standoffs between the boards. In one possible embodiment, as illustrated in FIG. 5, the board spacing is established by means of side panels 38, provided with shallow grooves 38a to engage a small portion (approximately 1 mm) of the right and left edge of each board 30a-30c. The side panels fully enclose the sides of the board stack, preventing air bypass at the sides to create an efficient channel for vertical air flow between each pair of boards. The panels 38 may be secured in place when the board stack is inserted into the housing 32. Clearances may be controlled such that once the boards 30a, 30b, 30c and panels 38 are fully inserted in the housing 32, they are mutually interlocked and retained in their correct positions for proper operation.

Figure 6:
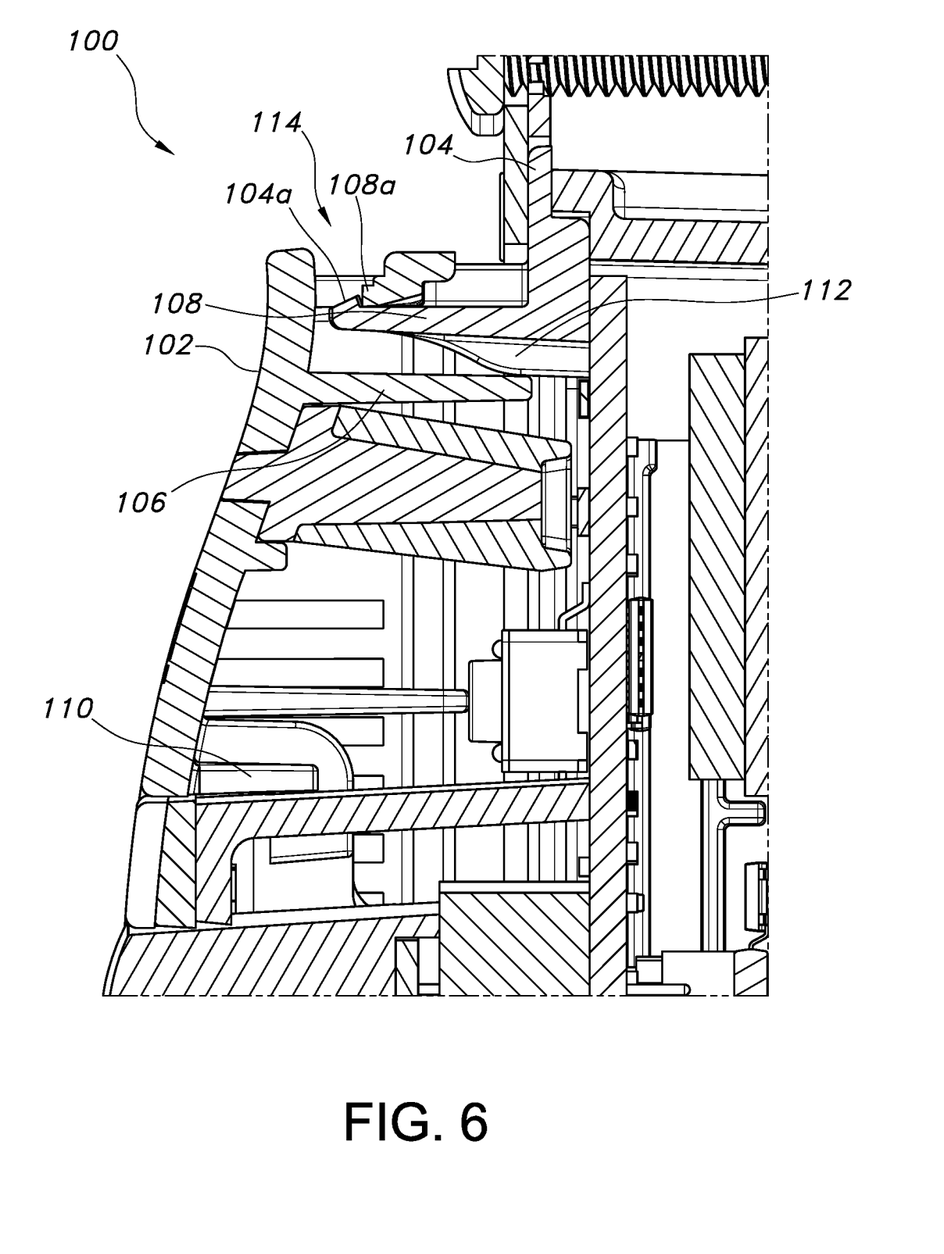
FIG. 6 is a cutaway cross-sectional side view illustrating one embodiment of an improved snap fit engagement.

According to a further aspect of the disclosure, and with reference to FIG. 6, an improved snap fit engagement 100 for retaining two components 102, 104 together (such as button 10a and housing 32) is described. The engagement 100 uses overlapping cantilever springs 106, 108, one formed in each of the two components 102, 104 of the engagement 100. The springs 106, 108 are arranged to provide increased depth of engagement while reducing the amount of strain experienced by each component 102, 104 in the course of assembly.

Figure 7:
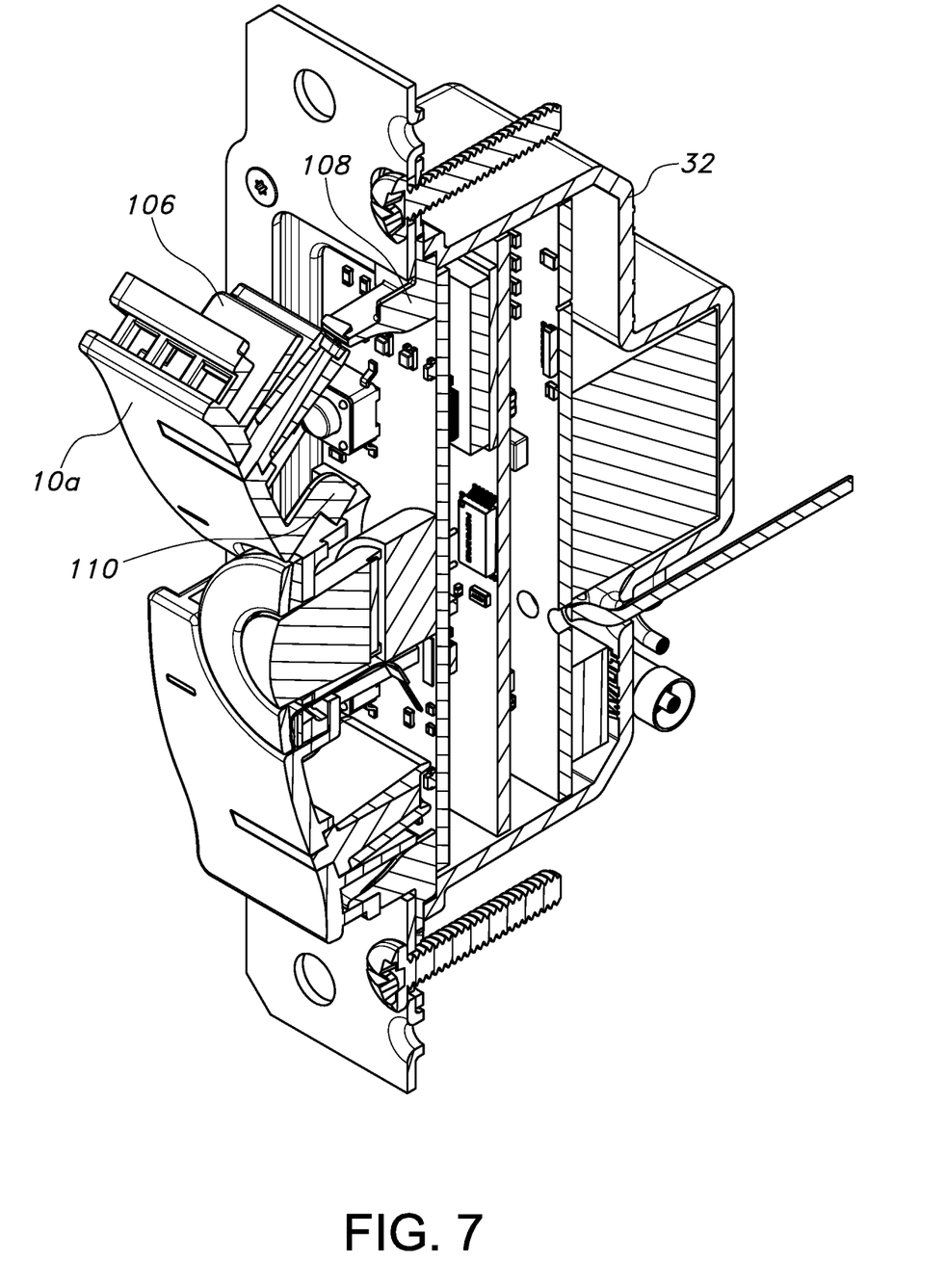
FIG. 7 is a partially cutaway perspective view illustrating the functioning of the snap fit engagement according to one possible embodiment.

More specifically, components 102 and 104 are firmly engaged together by a pivoting anchor 110, shown at the lower left of the illustration and in FIG. 7. During engagement, component 102 moves from left to right (as illustrated) relative to component 104. As it does so, the end of cantilever spring 106 encounters the slope of a spring interface ramp 112, which is part of component 104.

Upon continuing engagement, cantilever spring 106 is flexed downward by the spring interface ramp 112, also drawing downward the first component 104a of the snap fit engagement. As this first component 104a comes into contact with the second component 108a of the snap fit engagement, it exerts downward pressure on the cantilever spring 108, which is part of component 104 of the assembly 100. Thus, the necessary vertical displacement required for engagement of the snap fit engagement barb is distributed over the combined length of cantilever springs 106, 108, permitting a relatively high spring force and deep barb engagement while reducing the flexural strain in both of the cantilever springs 106, 108.

In the present embodiment, the tip of cantilever spring 108 is exposed to the outside of the assembly 100 through an opening 114 at the upper portion or top of component 102. Therefore, this assembly 100 may be released by reaching through this opening 112 from above with a suitably sized pin or similar tool and pressing downward on the snap fit engagement barb at the tip of cantilever spring 108. This releasable characteristic is optional, but may be particularly desirable in situations where space is constrained, such as in a wall mount application.

The foregoing description of several aspects of the embodiments disclosed herein is presented for purposes of illustration and description. The embodiments described are not intended to be exhaustive or to limit the invention to the precise form disclosed. Modifications or variations are possible in light of the above teachings. The embodiments described were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention when interpreted in accordance with the breadth to which it is fairly, legally, and equitably entitled.

The invention claimed is:

1. An apparatus for controlling a device in connection with a sensed temperature in a space, comprising:
   an actuator for regulating the operation of the device;
   a temperature sensor for providing the sensed temperature;
   a thermal antenna connected to the temperature sensor, the thermal antenna for conducting an air temperature in the space to the temperature sensor; and
   a housing with a plurality of spaced partitions forming one or more ventilation channels for ventilating the housing;
   wherein the thermal antenna is adapted to be at least partially exposed to the space;
   wherein the thermal antenna comprises a conductive material and a non-conductive material, the conductive material being exposed to the space; and
   wherein the non-conductive material and the conductive material form a pocket for receiving the temperature sensor.

2. The apparatus of claim 1, wherein the device is a light or a fan, and the actuator comprises a button for regulating an intensity of the light or a speed of the fan.

3. The apparatus of claim 1, further including a humidity sensor.

4. The apparatus of claim 1, further including a power converter.

5. The apparatus of claim 4, further including an insulator for insulating the thermal antenna and the temperature sensor from the power converter.

6. The apparatus of claim 1, further including a first vent and a second vent for promoting a flow of air, and wherein a sensor is positioned in a path of the air flow.

7. The apparatus of claim 6, wherein the sensor comprises a humidity sensor.

8. The apparatus of claim 6, further including a passageway for promoting a convective flow of air, wherein the convective flow of air promotes an intake of air into the first vent.

9. The apparatus of claim 1, wherein the plurality of partitions comprise a plurality of circuit boards for communicating with the actuator to provide control for the device, the circuit boards being spaced apart and forming the ventilation channel for ventilating heat from the housing.

10. The apparatus of claim 9, wherein at least three circuit boards are provided to create a ventilation channel between each adjacent pair of circuit boards, the at least three circuit boards creating two ventilation channels, at least one of which provides convective flow for promoting the flow of air into an inlet.

11. The apparatus of claim 9, wherein the circuit boards are in sealed engagement along sides of the housing but open at the top and bottom to promote controlled airflow through the channel.

12. The apparatus of claim 1, wherein the thermal antenna comprises part of an exposed face of the apparatus.

13. The apparatus of claim 1, wherein at least three partitions of the plurality of spaced partitions are provided to create a ventilation channel between each adjacent pair of partitions, the at least three partitions creating two ventilation channels, at least one of which ventilation channels provides convective flow for promoting the flow of air into an inlet.

14. The apparatus of claim 13, wherein the plurality of spaced partitions are in sealed engagement along sides of the housing but open at the top and bottom to promote controlled airflow through the channel.

\* \* \* \* \*